United States Patent [19]

Williams

[11] Patent Number: 4,911,572

[45] Date of Patent: Mar. 27, 1990

[54] CABLE TIE BACK CLAMP

[75] Inventor: Danny R. Williams, Houston, Tex.

[73] Assignee: Houston Industries Incorporated, Houston, Tex.

[21] Appl. No.: 206,027

[22] Filed: Jun. 13, 1988

[51] Int. Cl.⁴ .............................................. F16G 11/00

[52] U.S. Cl. .................................... 403/209; 403/399; 403/396; 439/791; 439/803

[58] Field of Search ............... 403/398, 399, 400, 395, 403/396, 209, 215; 439/803, 776, 777, 778, 791, 792, 794

[56] References Cited

U.S. PATENT DOCUMENTS

| | | | |
|---|---|---|---|
| 1,345,012 | 6/1920 | Jones . | |
| 1,716,904 | 6/1929 | Siderits | 403/396 |
| 1,942,341 | 1/1934 | Mangin . | |
| 2,151,524 | 3/1939 | Pitman et al. | 439/792 |
| 2,198,262 | 4/1940 | Bergan . | |
| 2,267,523 | 12/1941 | Haversat . | |
| 2,426,857 | 9/1947 | Birkenmaier . | |
| 2,506,010 | 5/1950 | Birkenmaier | 439/803 |
| 2,737,637 | 3/1956 | Scott . | |
| 2,915,733 | 12/1959 | Toedtman . | |
| 3,052,868 | 9/1962 | Margolies . | |
| 3,097,037 | 7/1963 | Gainer et al. | 403/400 X |
| 4,097,108 | 6/1978 | Prodel . | |
| 4,114,977 | 9/1978 | Polidori | 439/791 |

FOREIGN PATENT DOCUMENTS

| | | | |
|---|---|---|---|
| 804253 | 4/1951 | Fed. Rep. of Germany | 403/399 |
| 828999 | 1/1952 | Fed. Rep. of Germany | 439/778 |
| 900559 | 10/1944 | France | 403/396 |

*Primary Examiner*—Andrew V. Kundrat
*Attorney, Agent, or Firm*—Pravel, Gambrell, Hewitt, Kimball & Krieger

[57] ABSTRACT

A tie back clamp is provided for retaining a severed end of a power cable in a safe, removed position when it is necessary to cut the cable to perform service or otherwise work on the power line. The clamp retains a tail or end portion adjacent the location of the cut at a position transverse the remaining cable from which the stub or end portion extends.

12 Claims, 1 Drawing Sheet

CABLE TIE BACK CLAMP

BACKGROUND OF INVENTION

1. Field of Invention:

The present invention relates to tie back clamps for cables in electrical power distribution systems.

2. Description of Prior Art:

U.S. Pat. No. 4,661,662, of which applicant is a co-inventor, relates to an apparatus for suppressing electrical arcs which arise when an electrical power line must be severed or cut for service or other work on the power line. After the line is cut, it has been the practice to turn a tail or end portion using insulative manipulator poles, known as "hot sticks" in the industry. The tails of the line on each side of the cut are turned using the hot sticks back onto themselves and clamped or held in place on the main portions of the line with clamps.

So far as is known, prior tie back clamps ave been in the form of sockets or passages, one for the tail and one for the main cable portions, integrally formed or otherwise fixedly connected to each other. This has caused problems in tie back operations. If the clamp was located at a wrong position too near the cut end, the tail could not be brought back into the other socket or passage on the clamp without putting an undesirable crimp in the line. Also, particularly with cable of any considerable diameter, it was a strenuous and exacting process to bring the end of the tall into a position of alignment with the second socket or passage of the clamp. This was particularly so when the alignment was attempted by a line worker spaced from the clamp by the length of the hot stick.

SUMMARY OF INVENTION

Briefly, the present invention relates to a tie back clamp for cables for tying back an end or tail portion of the cable, preferably an electrical power cable, onto a main portion of the cable, after the tail portion has been brought into a position next to the cable and transverse the longitudinal axis of the main portion of the cable. The clamp is attachable to an end of an insulative manipulator rod or hot stick. A hook member, or preferably two, having a contact surface engages one of the portions of the cable, preferably the main portion, so that a line worker may exert a holding force on the cable portion. The hook members are mounted on a pair of spaced arms which define a passage slot for the other portion of the cable as the hook members are moved into engagement with the portion of the cable to be held by them. The spaced arms extend from a base member which has a threaded passage in it. A locking bolt which is adapted for rotational movement about its longitudinal axis in the threaded passage of the base member is also provided. The locking bolt is provided with a retractable wire gripping member which may be moved to grip the cable portions against the contact surfaces of the hook member and then retracted by rotating the locking bolt. The clamp of the present invention may thus bring both the tail portion and the main portion of the cable into firm engagement between the wire gripping member and the contact surface of the hook members. After appropriate service work on the cut line, the locking bolt of the clamp is then retracted so that the tail portion of the line may be released and reconnected to the other end of the line.

DESCRIPTION OF THE PREFERRED EMBODIMENT

Figure 3:
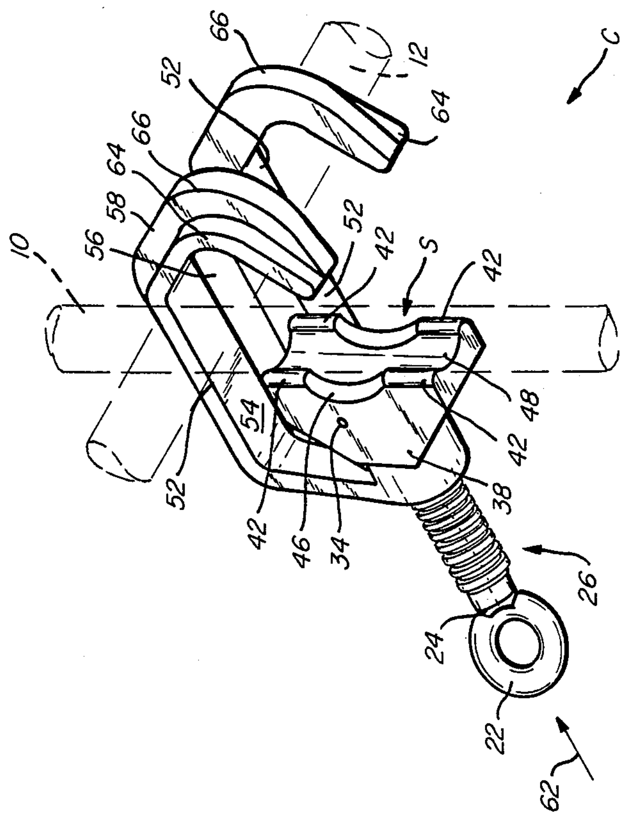
FIG. 3 is an isometric view of the apparatus of FIGS. 1 & 2.
Figure 1:
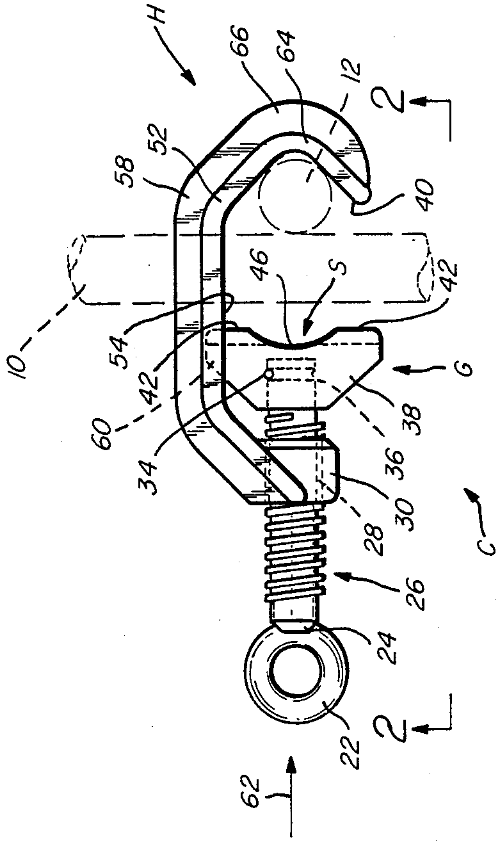
FIG. 1 is a side elevation view of a tie back clamp according to the present invention.
Figure 2:
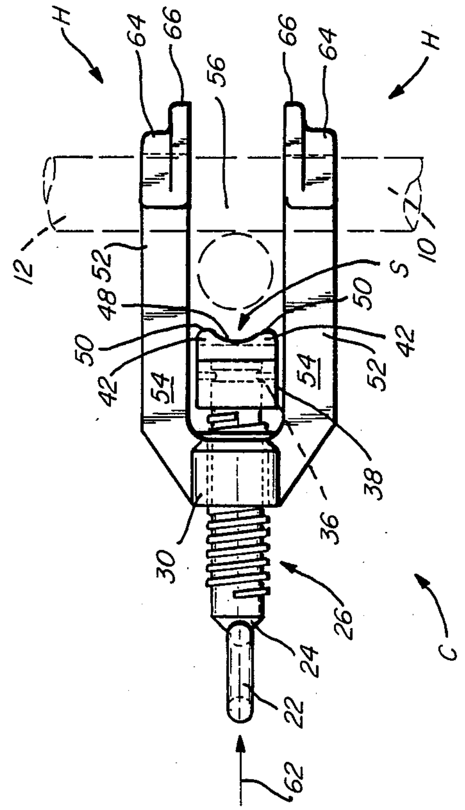
FIG. 2 is a view taken along the lines 2—2 of FIG. 1.

In the drawings (FIGS. 1-3) a clamp C according to the present invention is disclosed for tying back n end or tail portion 10 (FIG. 4) at each end of a cut made in a cable K, preferably an electrical power cable, onto a main portion 12 of the cable. As disclosed in U.S. Pat. No. 4,661,662, of which applicant is a co-inventor, it is often desirable to cut or sever the cable K for service or other reasons. The structure shown in U.S. Pat. No. 4,661,662 relates to an apparatus for suppressing any electrical arc formed when the cable K is cut during maintenance operations.

Figure 4:
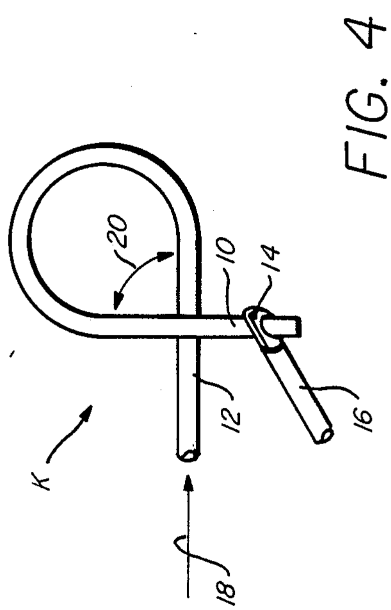
FIG. 4 is a side elevation view, at a reduced scale, of a cable tail being turned back prior to use of the clamp of FIG. 1.

During cable severing operations, the tail or end portion 10 is grasped or held by a gripping member 14 mounted at the end of an insulative manipulator rod 16, only a portion of which is shown in FIG. 4, known in the industry as a "hot stick." When the cable K has been severed, the tail portion 10 is moved b a line worker using the insulative rod 16 back into a position next to the main portion 10 of the cable and transverse a longitudinal axis 88 of the main portion 12. It is preferable that the tail portion 10 be brought into a position where it intersects the longitudinal axis 18 of the main portion 12 at an angle 20 of approximately 90° However, it should be understood that the angle 20 of intersection of the tail portion 10 with the main portion 12 of the cable K may be from about 75° to about 105° with respect to the longitudinal axis 18, depending upon working conditions Once the cable K has been moved into the position shown in FIG. 4 with the tail portion 10 next to the main portion 12 and transverse the longitudinal axis 18 thereof the clamp C of the present invention is then used to tie back or secure the tail portion 10 onto the main portion 12. The clamp C includes a connector eyelet 22 mounted at an end 24 of a threaded locking bolt 26. The connector eyelet 22 is adapted to be engaged by a connector member of a manipulating rod of like construction to the rod 16 operated by another line worker so that the threaded locking bolt 26 may be rotated and advanced or retracted through a correspondingly threaded socket 28 formed in a base member 30 of tee clamp C.

A wire gripping member G is mounted on an inner end 32 of the threaded locking bolt 26 by a connector pin 34 mounted in a groove 36 of the inner portion 32 of the threaded locking bolt 26. The wire gripping member G includes a head portion 38 through which the connector pin 34 passes and a contact saddle S which is adapted to contact one of the cable portions 10 or 12 and urge both of the cable portions 10 and 12 against a contact surface 40 of hook members H.

The contact saddle S includes a plurality of shoulder members 42 formed extending upwardly from the head member 38 at spaced positions from each other. The spaced shoulder member 42 form a pair of transversely extending intersecting troughs 46 and 48, respectively, between adjacent ones thereof. The troughs 46 and 48 are of a size adapted to receive a cable portion 10 or 12 as the case may be. The shoulders 42 have rounded upper surfaces 50 (FIG. 2) which are adapted to guide the cable portions 10 or 12 into the troughs 46 or 48, as the case may be.

The clamp C further includes a pair of spaced arms 52 which extend upwardly and outwardly from the base member 30 for a length to accommodate the diameters of the cable portions 10 and 12 and allow for travel of the head member 38 to bring the cable portions 10 and 12 into firm engagement with the contact surfaces 40 of the hook member H. The arm members 52 have a smooth contact surface 54 to allow for ease of movement of the cable members 10 and 12 into contact with each other against the contact surface 40. The space arms 52 define a passage slot 56 for the portion 10 of the cable K so that the clamp C may be moved past the cable portion 10 and the hook members H brought into engagement along their contact surfaces 40 with the cable portion 12. The line worker senses such engagement through the manipulative rod. The spaced arms 52 are provided with support ribs or stiffener member 58 for additional strength.

The passage slot 56 formed by the spaced arms 52 receives an inner portion 60 (FIG. 1) of the head member 38 therein. Accordingly, the spaced arms 52 and the passage slot 56 defined between them function as a guide channel to limit movement of the head member 38 in a plane transverse that of a longitudinal axis 62 about which the threaded locking bolt 26 is rotated during rotation by a line worker.

The hook members H take the form of a pair of spaced inverted stirrup or saddle members 64 having the generally V-shaped contact surface 40 formed thereon. The stirrup members 64 are extension of the arm members 52 and preferably of like size therewith. The hook members H are further spaced from each other a distance substantially equal to the width of the passage slot 56 formed between the spaced arms 52. Support ribs or stiffener members 66 are formed on the hook members H for additional strength. The support ribs 66 are of like configuration to and function as extensions of support ribs 58 formed on the arm members 52.

In the operation of the present invention, after the cable K has been cut and any arc formed thereby suppressed in accordance with U.S. Pat. No. 4,661,662, the tail portion 10 of the cable K is moved by the rod 16 into a position next to the main portion 12 of the cable K and at the angle 20 intersecting the longitudinal axis 18 thereof. As has been set forth, the angle 2 may vary from about 75° to about 105° but preferably is approximately 90°. It is preferable that the tail end 10 be brought back into a position (FIG. 4) facing the line worker using the clamp C since the worker may more clearly observe the clamping operations. However, it should be understood that in some circumstances the tail portion 10 may be on the opposite side of the cable 12 from the line worker.

The line worker using the clamp C then moves the clamp C toward the intersecting cable portions 10 and 12. As such movement occurs, the tail portion 10 of the cable passes between the spaced hook members H and into the passage slot 56 defined by the spaced arm members 52. The line worker then moves the clamp C until the hook members H pass beyond the main portion 12 of the cable. The hook members H are then moved until the cable portion 12 is grasped by the contact surfaces 40 of the hook members H. The line worker then may exert a holding force on the cable portion 12 while rotating the threaded locking bolt 26 through the connector eyelet 22 using a manipulator rod or hot stick.

As the threaded locking bolt 26 is advanced, the head member 38 moves forward within the passage slot 56 until contact is made by the saddle S with the tail portion 10 of the cable K. The threaded locking bolt 26 is then advanced until the tail portion 10 and the main portion 12 of the cable K are firmly brought into engagement between the saddle S and contact surface 40, holding the tail portion 10 firmly in a tied back position onto the main portion 12 of the cable K. A similar clamping function is also performed with another clamp C according to the present invention on the other portion of the cut cable K.

After service operations on the cable K have been completed, the threaded locking bolt 26 is then rotated in a reverse direction using the manipulator rod, retracting the head member 38 and saddle S in the passage slot 56 between the arm members 52 a sufficient distance so that the tail portion 10 is movable with respect to the cable portion 12. The hook members H of the clamp C are then released from engagement with the main portion 12 of the cable by an upward and outward lifting movement and the clamp C withdrawn as to the tail portion 10. The tail portion 10 may then be moved using the manipulator rod 16 and clamping member 14 into a position where it may be reconnected with the corresponding tail portion 10 of the other end of the severed cable K.

The foregoing disclosure and description of the invention are illustrative and explanatory thereof, and various changes in the size, shape and materials, as well as in the details of the illustrated construction may be made without departing from the spirit of the invention.

I claim:

1. A clamp for tying back an end or tail portion of a cable directly onto a main portion of the cable when the tail portion has been brought into a position transverse the axis of the main portion of the cable, comprising:
  (a) hook means having a contact surface for engaging the portions of the cable;
  (b) a pair of spaced arms on which said hook means is mounted, said arms defining a passage slot for one of the portions of the cable as said hook means is moved into engagement with the other of the portions of the cable;
  (c) a base member from which said arms extend, said base member having a threaded passage therethrough;
  (d) a locking bolt adapted for rotational movement about its longitudinal axis in said threaded passage of said base member;
  (e) wire gripping means mounted on said locking bolt for gripping the cable portions against said contact surface, said wire gripping means including:
    (1) a head member mounted on said locking bolt, movable inwardly and outwardly with respect to said contact surface depending on the direction of rotation of said locking bolt; and
    (2) contact saddle means on said head member comprising:
      (A) a plurality of shoulder members extending upwardly from said head member at spaced intervals from each other, and (b) a pair of transversely intersecting troughs formed between adjacent ones of said shoulders and adapted to receive a cable portion therein;

said contact saddle means contacting one of the cable portions and urging the cable portions against said contact surface.

2. The clamp of claim 1, further including:

a connector eyelet mounted on said locking bolt for engagement with a manipulator rod to rotate said locking bolt.

3. The clamp of claim 1 wherein:

said shoulder members have rounded upper surfaces to guide cable portions into said troughs.

4. The clamp of claim 1, further including:

means for connecting said head member to said locking bolt.

5. The clamp of claim 1, wherein:

said pair of spaced arms limit movement of said head member in a plane transverse that of its longitudinal axis.

6. The apparatus of claim 1, wherein said hook means comprises:

a plurality of spaced hook members mounted on said spacer arms opposite said base member, each having a contact surface found thereon.

7. The apparatus of claim 6, wherein:

said hook members are spaced from each other a distance substantially equal to the width of the passage slot.

8. The apparatus of claim 6, further including:

support ribs formed on surfaces of said hook members opposite said contact surfaces.

9. The apparatus of claim 1, further including:

support ribs formed on said arms.

10. The apparatus of claim 1, further including:

support ribs formed on said arms extending outwardly from said base member.

11. The apparatus of claim 1, wherein the cable is an electrical power line.

12. The apparatus of claim 1, wherein the tail portion is at an angle of from about 75° to about 105° with respect to the longitudinal axis of the cable.

* * * * *

UNITED STATES PATENT AND TRADEMARK OFFICE
CERTIFICATE OF CORRECTION

PATENT NO. : 4,911,572

DATED : March 27, 1990

INVENTOR(S) : Danny R. Williams

It is certified that error appears in the above-identified patent and that said Letters Patent is hereby corrected as shown below:

Col. 1, line 30, change "tall" to --tail--.
Col. 2, line 15, change "n" to --an--.
Col. 2, line 30, change "b" to --by--.
Col. 2, line 33, change "88" to --18--.
Col. 2, line 36, following the word "90°" add --.--.
Col. 2, line 41, following the word "conditions" add --.--.
Col. 2, line 45, following the word "thereof" add --,--.
Col. 2, line 54, change "tee" to --the--.
Col. 3, line 52, change "angle 2" to --angle 20--.

Signed and Sealed this

Twenty-sixth Day of March, 1991

*Attest:*

HARRY F. MANBECK, JR.

*Attesting Officer*

*Commissioner of Patents and Trademarks*